G. W. CLINE.
GRASS TRIMMING MACHINE.
APPLICATION FILED MAR. 22, 1912. RENEWED MAY 29, 1914.
1,128,226.
Patented Feb. 9, 1915.
5 SHEETS—SHEET 1.
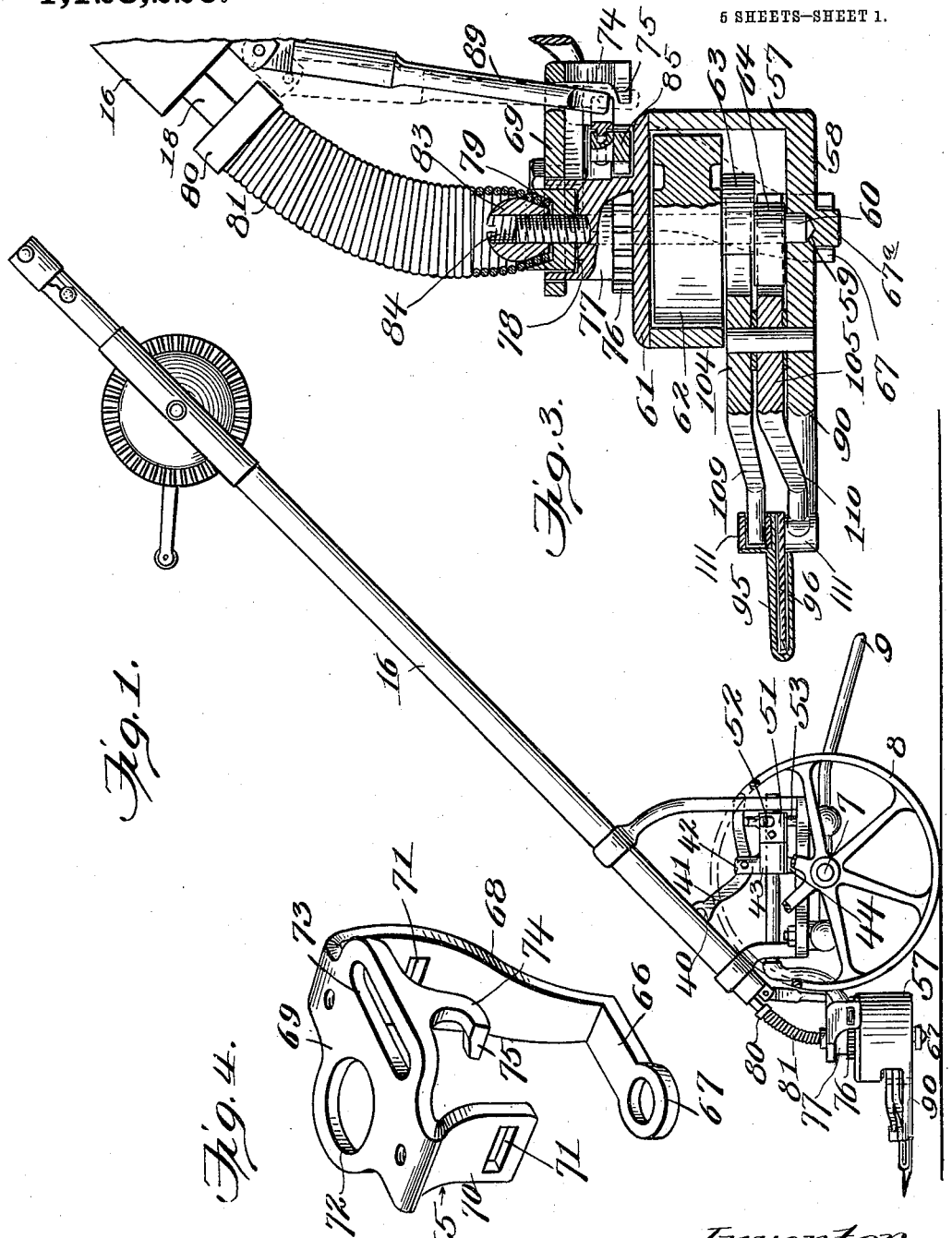
Witnesses
C. D. Kesler
Chas. S. Hyer.
Inventor
George W. Cline
by
Amos L. Norris
Atty.

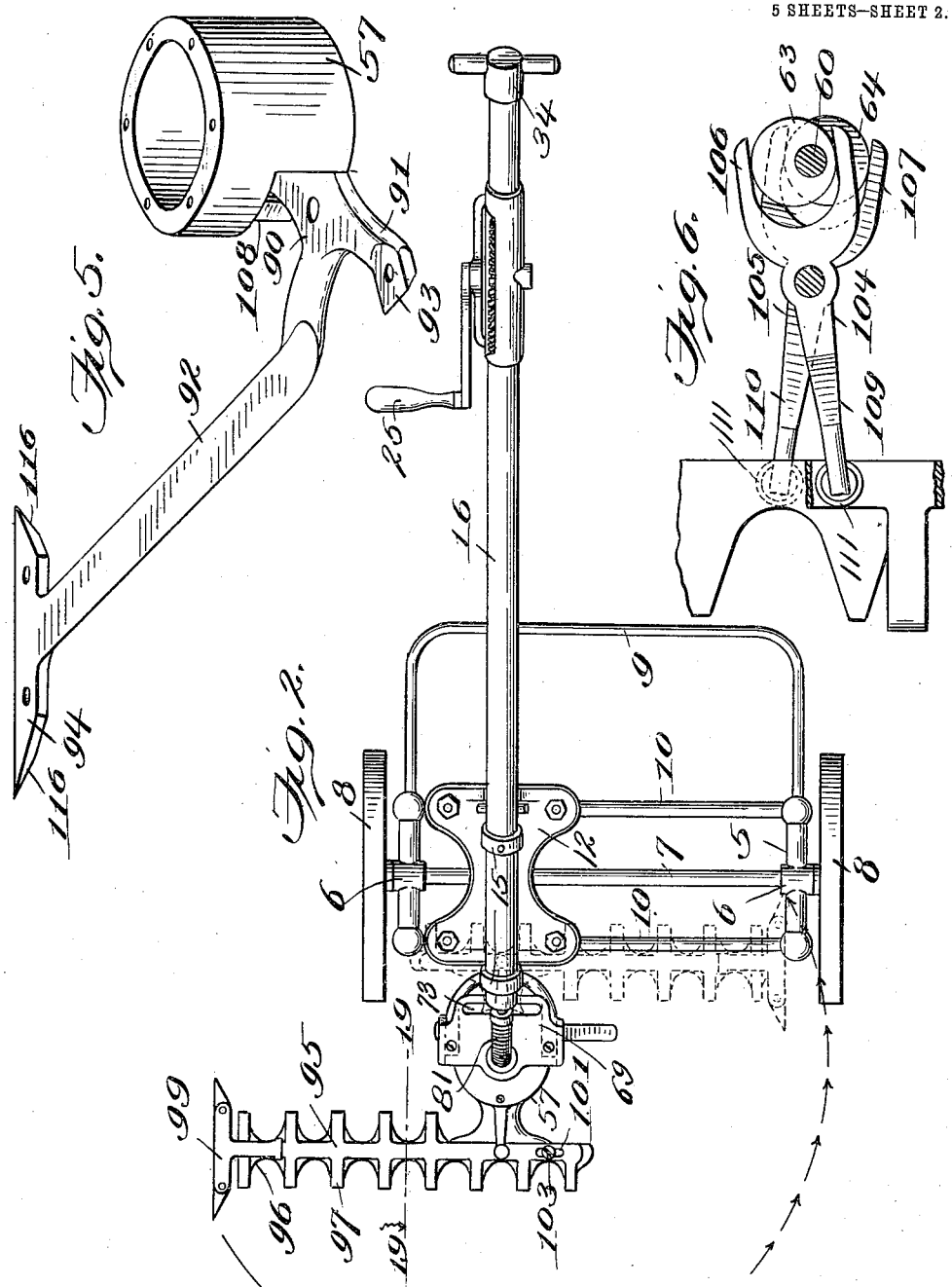

G. W. CLINE.
GRASS TRIMMING MACHINE.
APPLICATION FILED MAR. 22, 1912. RENEWED MAY 29, 1914.
1,128,226.
Patented Feb. 9, 1915.
5 SHEETS—SHEET 3.
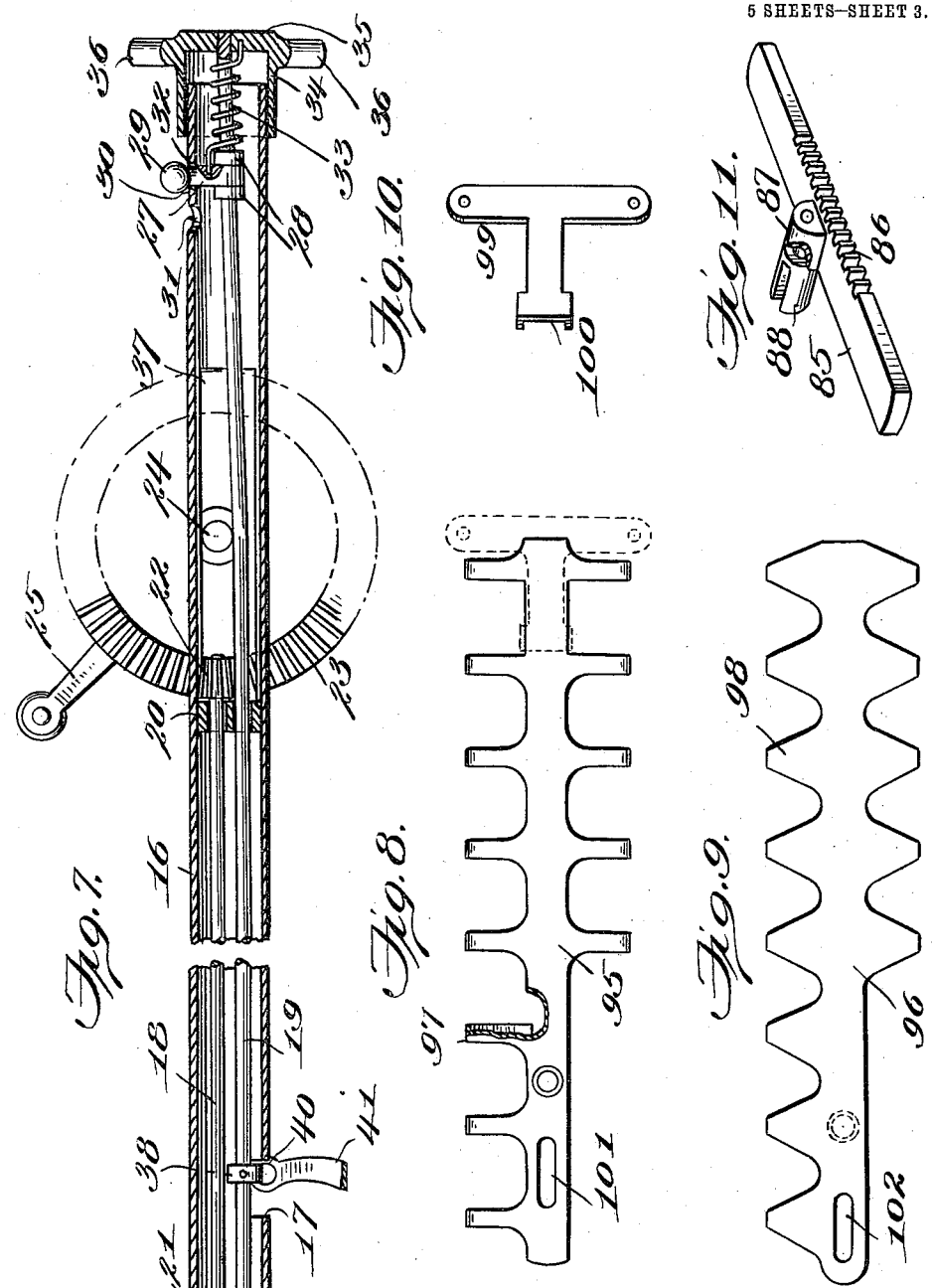

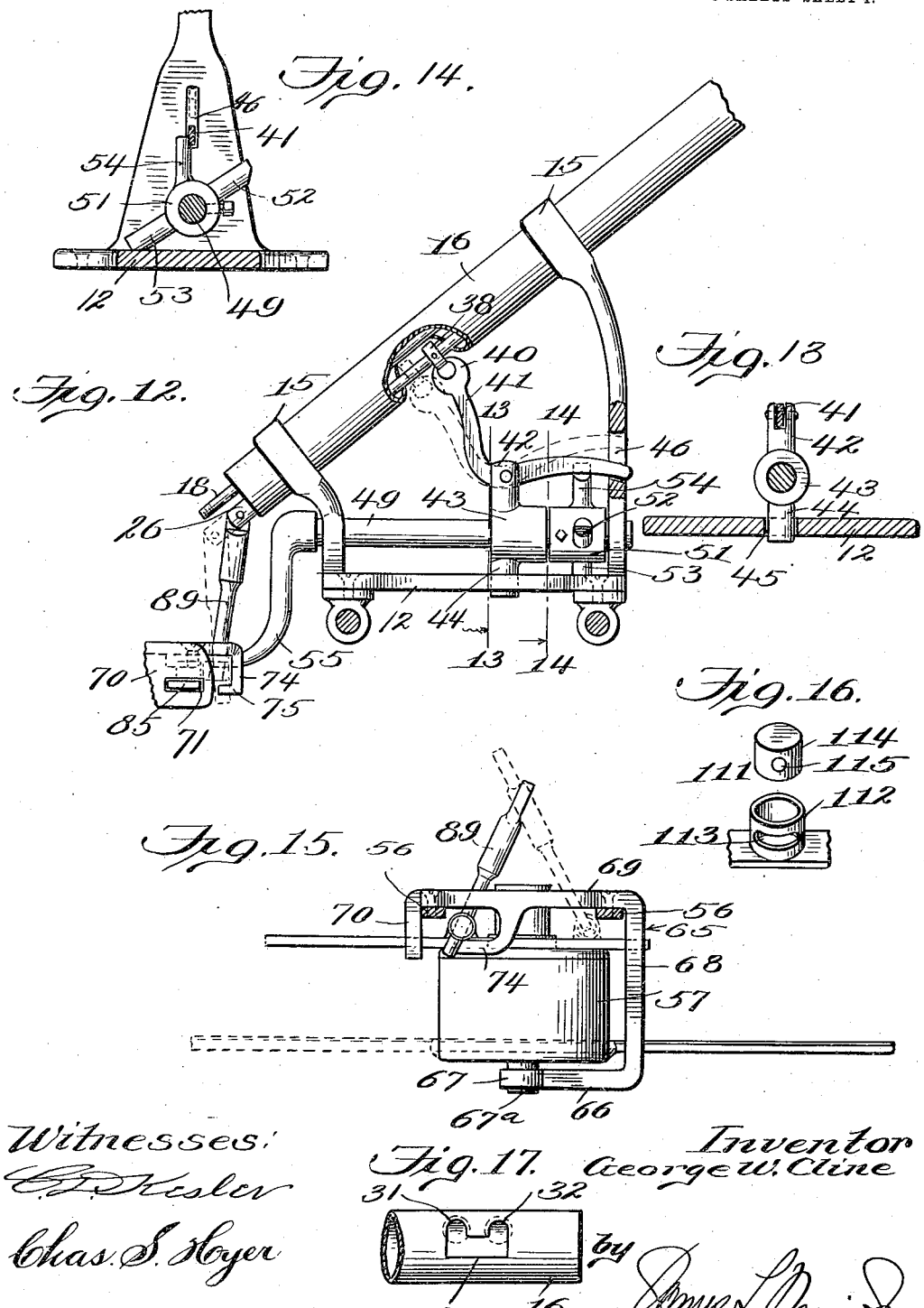

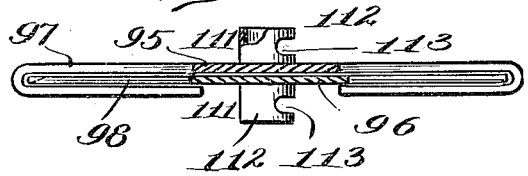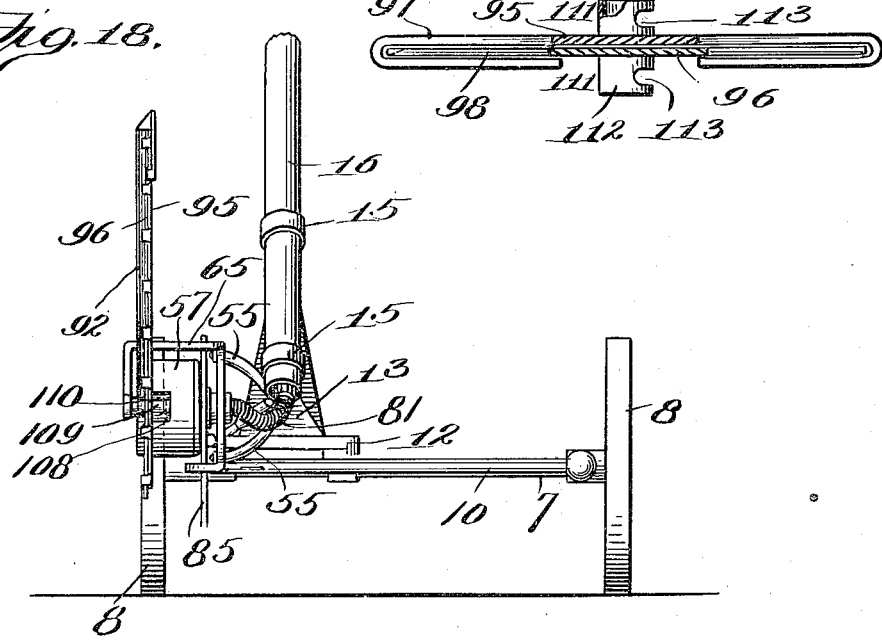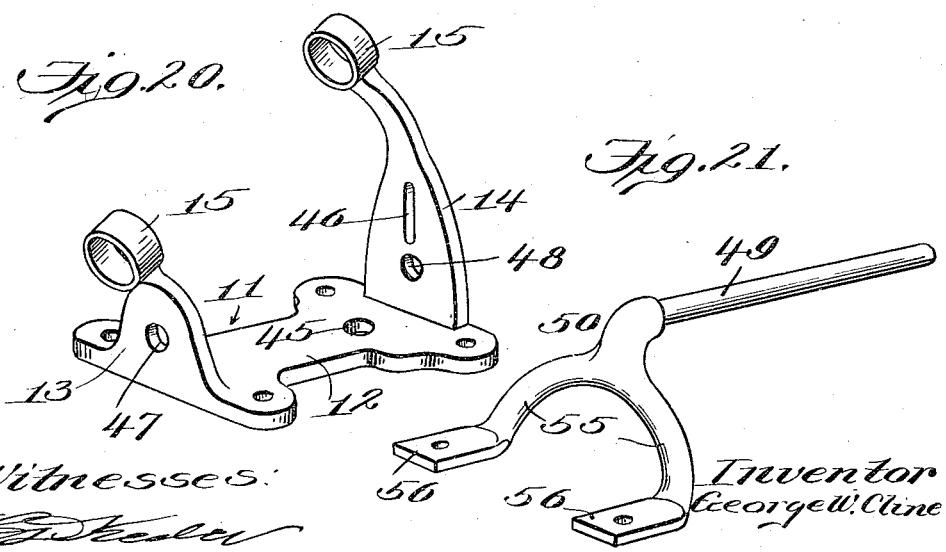

UNITED STATES PATENT OFFICE.

GEORGE W. CLINE, OF SANDPOINT, IDAHO.

GRASS-TRIMMING MACHINE.

1,128,226.     Specification of Letters Patent.     Patented Feb. 9, 1915.

Application filed March 22, 1912, Serial No. 685,425. Renewed May 29, 1914. Serial No. 841,964.

*To all whom it may concern:*

Be it known that I, GEORGE W. CLINE, a citizen of the United States, residing at Sandpoint, in the county of Bonner and State of Idaho, have invented new and useful Improvements in Grass-Trimming Machines, of which the following is a specification.

This invention relates to machines for trimming hedges and other analogous uses, and the primary object of the same is to provide means for positively operating the cutting elements and for causing the machine to run closely and trim or cut portions of lawns along the edges of a walk or around flower beds and in close corners as well as on the open or unobstructed surface of a lawn and also to provide for an elevation of the cutter bar and its supporting means when not in use, and for reversing the cutter bar and its supporting means to adapt the machine to cut either on the right or the left of the operator as conditions may require.

A further object of the invention is to provide a lawn trimmer or cutting apparatus having no actuating connecting means between the cutting mechanism and the wheels.

A still further object of the invention is to provide a lawn cutting or trimming machine designed to cut while moving either forwardly or backwardly or while motionless by manually swinging the sickle from right to left or vice versa; and, further, to provide for operation of the sickle in any position between a horizontal plane and an upright or vertical position as well as in a horizontal or a vertical position to provide for cutting grass on a lawn at any angle or for trimming edges that may be in a practically vertical plane.

The invention consists in the construction and arrangement of the several parts which will be more fully hereinafter described and claimed in preferred form.

In the drawings: Figure 1 is a side elevation of a machine embodying the features of the invention. Fig. 2 is a top plan view of the same, indicating by arrows the manner of reversing the cutter bar and its supporting means to adapt the same to cut either on the right or left of the operator. Fig. 3 is an enlarged detail sectional elevation of the lower portion of the machine and particularly showing the connection between the operating shaft and the devices for reciprocating the cutter bar. Fig. 4 is a detail perspective view of a frame or bracket embodied in the lower portion of the machine. Fig. 5 is a detail perspective view of a drum and arms connecting with the cutter bar structure. Fig. 6 is a top plan view partly in section showing the mechanism directly engaging and operating the cutter bar. Fig. 7 is an enlarged longitudinal section of the tubular handle. Fig. 8 is a detail plan view, partially broken away, of the finger bar. Fig. 9 is a detail plan view of the cutter bar or sickle. Fig. 10 is a detail perspective view of the retainer or clip engaging the outer end of the finger bar. Fig. 11 is a detail perspective view of the rack for controlling the reverse adjustment of the finger bar and sickle. Fig. 12 is an enlarged sectional side elevation, partially broken away, showing lower parts of the machine and particularly the means for locking the finger bar and sickle and operating mechanism therefor in angular position relatively to a horizontal plane. Fig. 13 is a transverse vertical section taken in the plane of the line 13—13, Fig. 12. Fig. 14 is a transverse vertical section taken in the plane of the line 14—14, Fig. 12. Fig. 15 is a detail side elevation of the lower drum and part of the mechanism coöperating therewith. Figs. 16 and 17 are detail perspective views of portions of the machine. Fig. 18 is a front elevation of the machine showing the handle broken away and illustrating the finger bar and sickle and relative parts elevated in vertical position. Fig. 19 is a transverse vertical section on an enlarged scale through the finger bar and sickle or cutter bar and taken in the plane of the line 19—19, Fig. 2. Figs. 20 and 21 are detail perspective views respectively of a portion of the supporting frame or one of the brackets and the fulcrum yoke mounted therein.

The numeral 5 designates a carrying frame having bearings 6 at opposite sides in which an axle 7 is rotatably mounted and provided with ground wheels 8, the said frame also having a rearwardly extended and downwardly deflected guard 9. The frame 5 also comprises two cross bars 10 respectively disposed in advance and in rear of the axle 7 and secured thereto is a connecting frame or bracket 11 embodying a flat base 12 with front and rear upwardly projecting arms 13 and 14, the arm 13 being of considerably less length than the arm 14, and both arms are provided at their upper ends with sleeves or collars 15 arranged in alinement at a downward angle of inclination. A tubular handle 16 is inserted through and suitably secured in the sleeves or collars 15 and embodies the prime operating devices for the machine. The handle 16 projects at its lower end a short distance in advance of the front arm 13 and its collar or sleeve 15, and the under portion of the said handle between the collars 15 is formed with a slot 17, as clearly shown by Fig. 7. The handle 16 incloses a drive shaft 18 and an adjusting rod 19 having both a rotary and a longitudinal shifting movement, the drive shaft 18 as well as the rod 19 being held in suitable bearings 20 and 21 fixed within the handle. The drive shaft 18 has a beveled pinion 22 on its upper end held in continual mesh with a beveled drive gear 23 supported by a stub shaft 24 fixed on the handle 16 and manually operative through the medium of a crank handle 25. The adjusting rod 19 has a bifurcated head 26 secured to the lower end thereof and a locking arm or projection 27 held between set collars 28 on the upper portion, the said locking arm or projection terminating in a spherical head 29 at its free end and movable longitudinally with the rod 19 and operating in a slot 30 in the handle 16 and laterally into retaining notches or seats 31 and 32 at opposite terminals of the said slot, as shown by Fig. 17 to lock the rod 19 in its adjusted positions. To return the rod 19 to normal position after release and also to insure retention of the arm or projection 27 in the notches or seats 31 and 32, a spring 33 is coiled around the upper portion of the rod 19 and connected at its lower terminal to the said arm or projection 27 and at its upper terminal to a tubular adjusting cap 34 which is mounted on the upper end of the handle 16 and free to be rotated and to have a longitudinal sliding movement on the handle end, the said cap being provided with a solid top plate 35 in which the upper end of the rod 19 is fixed through the medium of an angular formation of the rod end and the opening therefor, as clearly indicated by Fig. 7. To conveniently operate the cap 34 the top plate 35 is provided with diametrically opposed grip projections 36 and by means of which the operator can with one hand manipulate the rod 19 as may be desired and with the other hand turn the beveled gear 23 through the crank handle 25 and rotate the drive shaft 18. The pinion 22 projects through a slot 37 in the handle 16, and said slot is long enough to compensate for a close fitting of the gear 23 within the slot and without requiring an outward projection of the pinion 22. The lower portion of the adjusting rod 19 at the point where the slot 17 is formed has a collar 38 fixed thereon and fitted in a slot 40 in the upper end of an angle latch 41 fulcrumed at an intermediate point in an upstanding bifurcated post 42, see particularly Fig. 12, carried by a sleeve 43 having a lower projection 44 extending into an opening 45 in the base 12 of the frame or bracket 11 to hold the said sleeve and its post in fixed position. The lower end or arm of the locking latch 41 movably extends into and through a vertical slot 46 in the rear arm 14 of the bracket 11. Extending through openings 47 and 48 (Fig. 20) respectively formed in the arms 13 and 14 of the connecting frame or bracket 11 is a fulcrum stem or rod 49 of a yoke 50 (Fig. 21), the said fulcrum stem having secured thereon in rear of and close to the sleeve 43 means for coöperating with the lower end or arm of the latch 41 to limit the movement in opposite directions of the yoke, said means consisting preferably of a collar 51 having diametrically opposed stop projections 52 and 53 to engage the base 12 of the connecting frame or bracket 11 and also provided with a striker 54 having a reduced free end to engage the lower end or arm of the latch 41. In addition to the stem or rod 49 the yoke 50 embodies diverged legs 55 depending at an angle relatively to said stem or rod and each terminating in a horizontally disposed flattened foot or connecting terminal 56, both feet or terminals 56 being in the same horizontal plane and secured to the cutting mechanism and the inclosures and supports for portions of the same so that said mechanism as a whole may be readily swung or adjusted in various positions. In other words, the stem or rod 49 and the legs 55 embodied by the yoke 50 constitute the fulcrum means for the cutting mechanism, and the latch 41 together with the stops 52 and 53 and the striker 54, controls the degree of adjustment of the cutting mechanism at different angles relatively to a horizontal plane when the rod 19 is longitudinally shifted or pressed downwardly. When the rod 19 is pressed downwardly, the latch 41 is tilted, the lower member thereof is raised and released from the striker 54 to permit the rod 49 to rotate within the restrictions of the stops 52 and 53 which limit rotation of said rod 49 by engaging opposite portions of the base 12 of bracket 11, and the cutting mechanism will be raised and held at an angle without interfering with the operation of said mechanism. When the rod 19 is released, the spring 33 retracts the same and the parts are restored to normal position, as shown by Fig. 12. The locking arm 27 will, however, hold the rod 19 depressed and the cutting mechanism at an angular adjustment by engaging the lower notch 31 for instance.

The cutting mechanism, which is operated by the shaft 18, comprises in its organization a tubular drum 57, as clearly shown by Figs. 1, 3 and 5, and in the closed bottom 58 of this drum is a step bearing 59 in which the lower end of a shaft 60 is disposed, said shaft extending upwardly through the center of the drum and through a cap plate 61 secured on the top of the drum. A balance wheel 62 is secured on the shaft 60 within the drum, and below the balance wheel eccentrics 63 and 64 are also mounted on and keyed or otherwise secured to the said shaft 60 and arranged in such manner as to reversely operate the parts with which they coact, as more fully hereinafter explained. A guide frame or bracket 65, shown in detail by Fig. 4, is applied to the drum 57 and comprises a lower horizontal foot 66 terminating in an eye 67, fitted over a boss 67$^a$ depending from the center of the bottom 58 of the drum, and a leg 68 carrying the foot 66 and continuing from an upper horizontally flat top plate 69 from which also depends a leg 70 opposite the leg 68 and very much shorter than the latter. The legs 68 and 70 have alined slots 71 formed therein, and in the top plate 69 a circular opening 72 and an elongated slot 73 are formed, the edge of the top plate adjacent to the slot 73 having a depending guard 74 terminating in an inwardly projecting angular foot 75. The feet 56 of the yoke 50 project under the top plate 69 and are secured to the same by suitable fastening devices, as shown in Fig. 15, one of the legs 55 of said yoke engaging the guard 74. This guide frame or bracket 65 also serves as a suspending means for the cutting mechanism and its components, and by the interposition of the same between the drum 57 and mechanism carried by the latter and the fulcrum stem or rod 49 a steady support is provided during the adjustment or movement of the cutting mechanism in various positions.

Secured on the cap plate 61 is a pinion 76 having a hub 77 rising therefrom and projecting into the opening 72 of the top plate 69 of the bracket 65, the shaft 60 projecting through the hub and extending above the top plate 69 of the bracket. The upper end of the hub 77 is formed with a seat 78 and therein is rotatably fitted a cup 79 which is fast on the upper threaded portion 84 of the shaft 60. The coupling 81 between the upper end of the shaft 60 and the lower projecting end of the drive shaft 18 is flexible or yieldable to compensate for the various adjustments or movements of the cutting mechanism and its accessories, the threaded lower end of the said shaft 18 having connected thereto a coupling cap 80 in which the upper extremity of the said coupling 81 is secured. The coupling 81 is preferably formed of a coiled wire embodying closely arranged spiral convolutions, and its lower extremity is reduced and fitted in the cup 79 and held positively associated with the latter by an expanding member or nut 83 inserted through the coupling and engaging the aforesaid threaded portion 84 of the shaft 60. The upper end of the hub 77 is free to turn on the cup 79 in the opening 72 of the bracket 65 to permit the drum 57 and the parts carried thereby to turn or swing in a horizontal plane, and the means for so operating the drum and its parts consists of a transversely extending rack bar 85, shown in detail by Fig. 11, and having teeth 86 formed in the central portion of its front edge to continually engage the pinion 76. The opposite extremities of the rack bar 85 are freely slidable through the slots 71 formed in the legs 68 and 70 of the frame or bracket 65, and on the top central portion of this rack bar is an apertured lug 87 to which a bifurcated swivel coupling 88 is movably attached. Between the lower bifurcated head 26 of the adjusting rod 19 and the coupling swivel 88 to a link rod 89 is interposed and is pivoted at its opposite ends to the said head and coupling. The lower extremity of the link rod 89 projects through and is movable in the slot 73 formed in the top plate 69 of the frame or bracket 65, and since the adjusting rod is rotatable, it will, when thus operated, effect the lateral shifting movement of the link rod. This movement of said link rod will always be regulated, owing to the walls of the slot guiding said rod in its movements, and the rack teeth 86 will be thereby maintained in positive meshing relation to the pinion 76.

Extending outwardly from the bottom 58 of the drum 57 is a supporting yoke 90 (Fig. 5) comprising a short arm 91 and a longer arm 92 practically at right angles to the shorter arm, the arm 91 having a flattened securing terminal 93 and the arm 92 having a cross head 94 at its free extremity. The yoke 90 with its arms 91 and 92 is provided for positively and reliably supporting a finger bar 95 and cutter bar or sickle 96. The finger bar 95 and cutter bar or sickle 96 are constructed in such manner that their opposite edges may be brought into position for cutting operations, or the said parts are reversible and are adapted to be turned in right and left positions so that cutting operations may be carried on on either side of the handle bar 16. The finger bar 95, as shown in detail by Fig. 8, is formed of doubled or bent sheet metal and the fingers 97 are constructed as loops through which the teeth 98 at opposite sides of the cutter bar or sickle 96 have sliding movement. Both the finger bar and the sickle are without fingers and teeth adjacent to the point where the yoke 90 projects from the drum 57 so as to give a clearance for the operating mechanism or means for reciprocating the said finger bar and sickle. The finger bar 95 is held associated with the arm 92 of the yoke 90 by a clip or retainer 99 (Fig. 10) of T-shaped form and having its cross member secured to the cross head 94 of said arm and its longitudinal member projected inwardly over a portion of the said finger bar and terminating in a guide 100 which embraces an adjacent part of the finger bar and holds the latter steady or fixed against lateral shifting movement. At its inner extremity the finger bar 95 is formed with a longitudinal slot 101 and the corresponding extremity of the cutter bar or sickle 96 is also formed with a slot 102, and through the slots 101 and 102 a headed stud 103 projects from the terminal 93 of the arm 91 of the supporting yoke 90. Fulcrumed on the body of the yoke 90 adjacent to the point where the latter extends outwardly from the drum 57, is a pair of vibrating yokes 104 and 105 in superposed relation, as shown by Fig. 3, the arms 106 and 107 of which respectively engage the eccentrics 63 and 64 on the lower portion of the shaft 60, the said yokes movably extending through an opening 108 in the drum 57 adjacent to the yoke 90. The vibrating yokes also have outwardly projecting arms 109 and 110 respectively extending into swivel couplings 111 secured on the inner extremities of the finger bar 95 and cutter bar or sickle 96, the swivel coupling on the cutter bar or sickle projecting from the lower side of the latter and that of the finger bar extending upwardly from the top of the same. Each swivel coupling, as shown by Fig. 16, comprises a tubular member 112 having a slot 113 extending partially around the same for free movement therein of the outer end of the vibrating yoke arm, and a pivot member 114 which is loosely fitted in the tubular member 112 and has an opening 115 through which projects the free end of the yoke arm. A reliable and easy moving coupling is thus provided and embodies parts which are not liable to become separated. The opposite ends of the cross head 94 on the free extremity of the arm 92 of the yoke 90 are outwardly beveled as at 116 and the projection of the said head in opposite directions beyond the planes of the opposite side edges of the arm 92, together with the said beveled ends, operates to force all the grass to come in contact with the opposite cutting teeth of the bar or sickle 96, especially in operating close to walls or fences.

In the operation of the machine it will be understood that the cutter bar or sickle is rapidly reciprocated in one direction while the finger bar is similarly operated in a reverse direction relatively to the sickle through the medium of the vibrating yokes 104 and 105 actuated by the eccentrics 63 and 64 on the shaft 60, and to the latter motion is imparted from the driving shaft 18 through the manual actuation of the gear 23 and pinion 22. During such operation, whether the finger bar and sickle occupy either a right or left position, accidental movement or displacement from the position of adjustment of the finger bar and sickle will be prevented by the latch 41 and the striker 54 or until the adjusting rod 19 is operated to change the angle of the finger bar and sickle relatively to a horizontal plane. Furthermore, while the machine is at a standstill or moving, the finger bar and sickle may be thrown from one side to the other or alternately shifted from a right to a left position or vice versa by correspondingly turning the cap 34. This movement of cap 34 serves to rotate rod 19, to which it is connected, and since the lower end of said rod is directly connected to the link rod 89, the latter will be caused to swing in the slot 73 in the top plate 69 of bracket 65. The lower end of link rod 89 is connected, in turn, to the rack bar 85 by the parts 88 and 87, and, therefore, the swinging movement of said link rod operates to shift the said rack bar endwise, thereby rotating pinion 76. Said pinion, being fixed to the cap plate 61 or drum 57, as previously stated, serves, in consequence, to rotate said drum, without effecting, however, any rotation of shaft 60 or of the coupling 81. The cutting mechanism, being connected to said drum by means of yoke 90, will thus be thrown to one side or the other, according to the direction in which rod 19 is rotated by cap 34, and, in consequence, the scope of the machine in cutting operations requiring a change of disposition of the said mechanism will be materially increased. When it is desired to adjust the cutting mechanism in a vertical plane, the arm 27 is first disengaged from the upper notch 32 and cap 34 is then pressed downward upon handle 16. This operation serves to move rod 19 in the same direction, during which movement latch 41 is rocked into its dotted line position, Fig. 12, thus moving its lower arm past striker 54, the actuation of said latch being caused by the engagement of its notched end 40 with collar 38. When rod 19 moves downward, it forces link rod 89 to move downward and, also, to rock slightly forward, owing to its passage through slot 73, as will be understood from Fig. 3, wherein the position of said link rod at the end of such movement is represented in dotted lines, and it will be seen from Fig. 3 that the lower end of the link rod extends vertically across one side of the foot 75 of guard 74. At the completion of the downward movement of rod 19, its locking arm is forced into the lower seat 31 by spring 33, and cap 34 is then turned or rotated upon handle 16, so as to impart a corresponding movement to rod 19 and, consequently, a swinging movement to link rod 89, and since the latter engages foot 75, as already stated, this movement of said link rod will produce a similar movement of bracket 65 and drum 57 either to the right or the left, according to the direction of movement of cap 34. Drum 57, when thus turned or swung, serves, in turn, to swing the cutting mechanism correspondingly, owing to its connection therewith through the agency of the parts 91 and 92, but such movement of said mechanism does not stop its operation, as the flexible coupling 81 will assume a corresponding angular position, (see Fig. 18.) Shaft 49, being connected to the top plate 69 of bracket 65 by the parts 55 and 56, is rotated during the swinging movement of said bracket and the cutting mechanism, and in turning, moves striker 54 beneath the then raised latch arm, its movement being terminated by the contact of stop 52 with the base plate 12 of bracket 11. When these operations have been completed, arm 27 is released from notch 31, whereupon spring 33 automatically moves rod 19 upward to its initial position, during which time the return movement of latch 41 is produced by the engagement of the parts 38 and 40, said arm being engaged in the upper notch 32 at the termination of the aforesaid movement of the rod. When the return movement of latch 41 takes place, striker 54 occupies a position at the opposite side of the latch arm from that depicted in Fig. 14, and for this reason the backward, or return, swing movement of the parts 51, 49 and 50, and, consequently, of the drum 57, the supporting bracket 65 and the cutting mechanism proper, is prevented. While two notches only are shown in the construction illustrated, it will be apparent that any desired number may be provided, thereby increasing the range of endwise adjustment for the rod 19. It will be understood, therefore, that the cutting mechanism may be operated at any desired angle, or vertically, with the same efficiency as when disposed in horizontal position, and, also, that said mechanism, with all its accessories, may be turned up into vertical position, when not in use, and maintained against displacement from such position. Furthermore, the finger bar and cutter bar or sickle may be separated from the remaining mechanism, to permit the sharpening of the cutting teeth or the replacing of a part, if broken.

What is claimed is:

1. In a trimming machine of the class specified, the combination of a frame having a tubular propelling handle; a member movable therein; cutting devices; means for operating the same; and mechanism operatively connected with said member for swinging the cutting devices alternately from one side of the machine to the other.

2. In a trimming machine of the class specified, the combination of a frame having a tubular propelling handle; a member movable therein; cutting devices; means for operating the same; and mechanism operatively connected with said member for moving the cutting devices at any angle between a horizontal plane and a vertical plane, or in a vertical plane.

3. In a trimming machine of the class specified, the combination of a frame having a tubular propelling handle; a member movable therein; cutting devices; means for operating the same; and mechanism operatively connected with said member for disposing the cutting devices in either right or left position and at any angle above the horizontal.

4. In a trimming machine of the class specified, the combination of a frame having a tubular propelling handle; a member movable therein; cutting mechanism; mechanism operatively connected with said member for swinging the cutting mechanism at any angle above the horizontal; a drive shaft; and a yielding coupling between said shaft and said cutting mechanism.

5. In a trimming machine of the class specified, the combination of a frame having a tubular propelling handle; a member movable therein; cutting mechanism; mechanism operatively connected with said member for swinging the cutting mechanism into either right or left position and at any angle above the horizontal; a drive shaft; and a yielding connection between said shaft and said cutting mechanism for operating the latter from the former and for compensating for the different adjustments.

6. In a trimming machine of the class specified, a cutting mechanism, a rack and pinion coöperating with said mechanism to throw the same laterally in a horizontal plane into right and left positions, an adjusting rod operatively connected with the said rack, and a drive shaft connected to said mechanism.

7. In a trimming machine of the class specified, the combination of a frame having a hollow propelling handle; cutting mechanism embodying a reversible finger bar and sickle; and means arranged within said handle and connected with said cutting mechanism for swinging said finger bar and sickle from one side to the other.

8. In a trimming machine of the class specified, the combination of a frame having a hollow propelling handle; cutting devices;

means arranged within said handle and connected with said cutting devices for moving the latter into either right or left position and at any angle above the horizontal; and means for locking said cutting devices against movement when disposed horizontally.

9. In a trimming machine of the class specified, the combination of a frame having a hollow propelling handle; cutting devices; means arranged within said handle and connected with said cutting devices for moving the latter at any angle above the horizontal; and means for locking said cutting devices against movement when disposed horizontally.

10. In a trimming machine of the class specified, the combination of a frame having a tubular propelling handle; cutting devices and operating means therefor; and an endwise movable and rotatable rod mounted in said handle and connected with said cutting devices for moving the latter into either right or left position and at any angle above the horizontal.

11. In a trimming machine of the class specified, the combination of a frame having a tubular propelling handle; cutting devices and operating means therefor; an endwise movable and rotatable rod mounted in said handle and connected with said cutting devices for moving the latter into either right or left position and at any angle above the horizontal; and means for locking said cutting devices against movement when disposed horizontally.

12. In a trimming machine of the class specified, the combination of a frame having a tubular propelling handle; cutting mechanism; a drive shaft and an adjusting rod arranged within said handle; connections between said shaft and said cutting mechanism for operating the latter; and separate connections between said rod and the cutting mechanism for shifting the position of said cutting mechanism in the machine.

13. In a trimming machine of the class specified, the combination of a frame having a tubular propelling handle; cutting mechanism; a drive shaft and an adjusting rod arranged within said handle; a flexible coupling between said shaft and said cutting mechanism for operating the latter; and separate connections between said rod and the cutting mechanism for shifting the position of said cutting mechanism in the machine.

14. In a trimming machine of the class specified, the combination of a frame having a tubular propelling handle; cutting mechanism; a drive shaft and an adjusting rod arranged within said handle; a flexible coupling between said shaft and said cutting mechanism for operating the latter; and a rack and pinion coöperating with said cutting mechanism to turn the same into either right or left position, said adjusting rod being operatively connected with the said rack.

15. In a trimming machine of the class specified, the combination of a frame having a tubular propelling handle; cutting mechanism and driving means therefor; a rack and pinion coöperating with said mechanism for turning the same into either right or left position; and an adjusting rod arranged within said handle and operatively connected with the said rack.

16. In a trimming machine of the class specified, the combination of cutting mechanism and driving means therefor; a rack and pinion coöperating with said mechanism for throwing the same laterally in a horizontal plane into either right or left position; and a rotatable adjusting rod operatively connected with the said rack.

17. In a trimming machine of the class specified, the combination of cutting mechanism and driving means therefor; and an endwise-movable and rotatable adjusting rod operatively connected with said mechanism for turning the same into either right or left position and at any angle above the horizontal.

In testimony whereof I have hereunto set my hand in presence of two subscribing witnesses.

GEORGE W. CLINE.

Witnesses:
G. H. MARTIN,
F. M. MOLYNEUX.

Copies of this patent may be obtained for five cents each, by addressing the "Commissioner of Patents, Washington, D. C."